United States Patent
Nazri et al.

(10) Patent No.: US 7,018,607 B2
(45) Date of Patent: Mar. 28, 2006

(54) CATHODE MATERIAL FOR LITHIUM BATTERY

(75) Inventors: Gholam-Abbas Nazri, Bloomfield Hills, MI (US); Gregory Charles Garabedian, Warren, MI (US)

(73) Assignee: General Motors Corporation, Detroit, MI (US)

( * ) Notice: Subject to any disclaimer, the term of this patent is extended or adjusted under 35 U.S.C. 154(b) by 153 days.

(21) Appl. No.: 10/603,910

(22) Filed: Jun. 25, 2003

(65) Prior Publication Data

US 2004/0265216 A1   Dec. 30, 2004

(51) Int. Cl.
  *C01G 49/00*   (2006.01)

(52) U.S. Cl. .............. 423/593.1; 423/594.4; 423/594.6; 423/599; 423/600

(58) Field of Classification Search ........... 423/593.1, 423/594.4, 594.6, 599, 600
See application file for complete search history.

(56) References Cited

U.S. PATENT DOCUMENTS

| 5,985,488 A | * | 11/1999 | Mitate et al. ............... 429/223 |
| 6,054,110 A | | 4/2000 | Yamada et al. |
| 6,071,489 A | | 6/2000 | Sun et al. |
| 2003/0031930 A1 | | 2/2003 | Hamano et al. ......... 429/231.3 |

* cited by examiner

*Primary Examiner*—Steven Bos
(74) *Attorney, Agent, or Firm*—Kathryn A. Marra

(57) ABSTRACT

A method is disclosed for synthesizing a crystalline metal oxide powder material containing two or more uniformly distributed metal elements. Crystalline, water containing, oxygen containing inorganic acid salts of the metals are heated to liquefy the salts. The apparent solution contains a uniform mixture of the metal elements. The water is removed from the liquid and the resulting powder calcined in air to decompose the acid salts to a mixed metal crystalline oxide. The method is particularly useful to make doped $LiNiO_2$ type crystals using hydrated nitrate or nitrite salts of Li, Ni and the dopant elements. Examples of useful salts are $LiNO_3 \cdot H_2O$, $Ni(NO_3)_2 \cdot 6H_2O$, $Co(NO_3)_2 \cdot 6H_2O$, $Al(NO_3)_3 \cdot 9H_2O$, and $Mg(NO_3)_2 \cdot 6H_2O$.

11 Claims, 4 Drawing Sheets

CATHODE MATERIAL FOR LITHIUM BATTERY

TECHNICAL FIELD

This invention pertains to a method for preparing crystalline oxides containing a uniform distribution of two or more metal elements within the crystal lattice. The invention is applicable to making lithium nickel oxide type cathode material for lithium-ion type batteries. More specifically this invention pertains to an economical and efficient method of making stabilized $Li(Ni_{1-x}M_x)O_2$ cathode materials.

BACKGROUND OF THE INVENTION

Li-ion secondary (rechargeable) batteries are widely used for portable battery applications and may find uses in larger size batteries for stationary and transportation applications. As an example, such a battery includes a lithium metal or lithium alloy containing an anode plate, a non-aqueous lithium ion containing electrolyte and an active cathode comprising $LiMO_2$, where M has been a transition metal such as cobalt or nickel or manganese. During charging of this type of battery, lithium ions are removed from the cathode when the oxidation state of the transition metal component of the cathode increases. Lithium ions are inserted in the cathode during reduction at the cathode when the oxidation state of the transition metal component is lowered. Discharging of the battery involves the reverse oxidation-reduction reactions. These electrochemical cells offer relatively high voltage and high energy density performance. In particular, the composition of the cathode and the method by which it is made affects the cost, performance and utility of these batteries.

Current Li-ion batteries often use lithium cobalt oxide ($LiCoO_2$) based cathode material. Due to the high cost of lithium cobalt oxide and environmental issues concerning cobalt there have been extensive efforts to replace the lithium cobalt oxide with a less expensive material such as lithium manganese oxide ($LiMnO_2$) or lithium nickel oxide ($LiNiO_2$). However, lithium manganese oxide is a much less effective cathode material than lithium cobalt oxide, and lithium nickel oxide decomposes when over ⅔ of the lithium is removed (during charge) from its crystal structure. To stabilize the lithium nickel oxide system, partial elemental substitutions on the nickel sites are proposed but they have proven difficult to prepare with uniformity and low cost.

The preparation of lithium nickel oxide compositions partially doped with other elements is usually done by a ceramic processing technique, where a mixture of the oxide precursors are ground to fine powder and heat treated at elevated temperatures (700°–900° C.) in an oxygen atmosphere. The high-temperature ceramic techniques do not produce satisfactory mixing of the doping elements to provide a uniform distribution of the doped elements in the crystal matrix of the lithium nickel oxide. In addition, the ceramic technique requires multiple grinding and heat treatments to achieve even macroscopic mixing. In most cases the ceramic technique provides domains, which are rich in one element and deficient with respect to the other elements. The heat treatment of lithium nickel oxide also needs to be done in an oxygen or oxygen rich atmosphere.

Experimental lithium nickel oxide cathode materials partially doped with other elements have also been made by aqueous solution and precipitation processes and aqueous solution and drying processes. But these practices have been very slow and required high energy consumption for removal of the water.

It is an object of the present invention to provide a practical and efficient method of making uniformly doped lithium nickel oxide compositions for cathode application in lithium-ion secondary batteries. It is a more general object of this invention to provide a method of making mixed metal oxide crystalline materials of the $(M_1M_2)O_2$ type where the two or more metallic elements are uniformly (or naturally) distributed in the crystal lattice.

SUMMARY OF THE INVENTION

This invention provides a new solution process to prepare the stabilized lithium nickel oxide cathode by uniform distribution of the doping element(s) in the cathode material.

The process of the invention comprises forming a concentrated liquid mixture from suitable hydrated salts of lithium and nickel plus hydrated salts of desired doping agents. Preferably, crystalline nitrate salts of these metals with water molecules in the crystals are used. Mixtures of these crystalline salts act like eutectic materials in that they can be heated to form a liquid at a relatively low temperature. The liquid provides a medium for a uniform mixture of the metal cations that are to be incorporated into the cathode material. The liquid is like a concentrated solution. It contains a minimal amount of water for relatively efficient desiccation to an anhydrous powder. Then upon heating in air the nitrate anions in the powder release nitrogen oxides to leave a residue of the lithium, nickel and doping elements in a crystalline oxide suitable for use as active cathode material in a lithium secondary battery. While hydrated nitrate salts are preferred for their availability and effectiveness in the process of this invention, other acidic salts may be used, particularly inorganic acid salts, such as nitrite salts, having good water solubility.

In a preferred embodiment of the invention, an aqueous liquid, probably a concentrated solution, is formed containing the nitrate salts of lithium and nickel plus the nitrate salts of selected doping elements such as cobalt, aluminum and magnesium. The water for the liquefaction or solution is provided by the water molecules of crystallization present in the solid hydrated nitrate salts of the metals selected for incorporation in the cathode material. Crystalline lithium nitrate is available with one water of crystallization ($LiNO_3 \cdot H_2O$) or lithium nitrate may be used in its anhydrous form. The nitrates of nickel, cobalt, aluminum and magnesium, for example, are commercially available as $Ni(NO_3)_2 \cdot 6H_2O$, $Co(NO_3)_2 \cdot 6H_2O$, $Al(NO_3)_3 \cdot 9H_2O$, and $Mg(NO_3)_2 \cdot 6H_2O$. Most of the elements that might be desired as dopants in the lithium nickel oxide cathode material are available in the form of their hydrated nitrate salts and would be used in that form in the practice of this invention. Only titanium among the preferred dopants is not generally available as a nitrate. Ti can suitably be added as $TiO_2$ as will be illustrated.

Thus, the cathode material to be made by this process may be represented as $Li(Ni_{1-x}M_x)O_2$; where M is one or more additional transitional elements such as Co, Cr, Mn and Ti, or any suitable metal element having an outer sp-type electron shell. These sp elements include, for example, Al and Mg. With both cathode cost and performance considerations in mind, cathode compositions of the formula $Li[Ni_{(0.5-0.7)}Co_{(0.1-0.2)}M_{(0.1-0.4)}]O_2$ are preferred. The number of lithium atoms in the cathode material matches the total number of nickel atoms plus the dopant atoms. Since the cathode is to be a doped nickel cathode it is preferred that nickel make up half or more of the metallic elements other than lithium. Cobalt enhances the electrochemical performance of the cathode but increases its cost. Therefore, it is preferred that cobalt constitute no more than ten to twenty percent of the non-lithium metal element content. The other dopant elements are used as low cost stabilizers of the nickel oxide containing crystal.

With a desired cathode composition in mind, the respective proportions of the metallic elements are added as their hydrated nitrate salts. Anhydrous lithium nitrate and $TiO_2$ powder may be used. The mixture including hydrated nitrate salts is heated carefully to release the water from the crystalline material and use it to form a concentrated liquid or solution (like a eutectic melt) of the nitrate salts. A small amount of powdered titanium dioxide can be stirred and uniformly dispersed into the liquid. Thus, the process takes advantage of the crystalline water molecules that normally exist in stable metal salts, particularly the nitrate salts. The commingled crystalline metal nitrates containing various proportions of crystalline water molecules interact with each other to form a supersaturated liquid phase according to the following equation:

$$LiNO_3 + 1-m\ Ni(NO_3)_2{:}6H_2O + m\ M(NO_3)_x{:}y\ H_2O \rightarrow n\ H_2O + LiNO_3 + 1-m\ Ni(NO_3)_2 + m\ M(NO_3)_x\ (these\ products\ in\ aqueous\ liquid);$$

where M includes one or more transition metals such as cobalt, chromium, manganese and titanium, and/or sp electron shell type metals such as Al and Mg; and $n=m(y+6)+6$.

The water is then carefully removed from the liquid (presumably a solution), preferably by vacuum desiccation, to form a dry powder that contains a uniform mixture of the nitrate salts in anhydrous form. If titanium dioxide had been added, it is present as powder particles dispersed among the nitrate salts. The solution contains a minimal amount of water. Preferably, the solution is initially subjected to reduced pressure at ambient temperature and water vapor is carefully removed through the vacuum system. The temperature is gradually increased to remove all the water without expelling solid material.

The dried salt mixture is then heated in air to thermally decompose the nitrate salts and form the metal oxides. Nitrogen oxides are expelled without chemical reduction of the oxides. Heating is done at suitable temperatures from 300° C. to 800° C. The reaction that forms the oxides yields the desired $LiNiO_2$ type crystal structure in which doped $NiO_2$ containing layers or slabs are present with removable Li+ ions situated between the layers. This reaction in air may be represented as follows:

$$LiNO_3 + 1-m\ Ni(NO_3)_2 + m\ M(NO_3)_x \rightarrow Li[Ni_{1-m}M_m]O_2\ plus\ evolved\ NO_x.$$

Thus, the heat treatment of the desiccated mixed salts provides cathode material in the form of a fine powder. The crystal structure of the new material remains the same as those of the parent compound ($LiNiO_2$). The crystal structure, surface area, and electrochemical properties of the new cathode materials in lithium cells have been tested and they perform well as cathode materials in lithium cells.

As apparent from the above description, this invention was developed for synthesizing lithium nickel oxide type active cathode materials for lithium secondary batteries. However, the synthesis method clearly has much wider application to the preparation of many types of complex crystalline metal oxides, especially metal oxides of the $(M_1M_n)O_2$ type, where the M s represent metallic elements.

Other objects and advantages of the invention will become more apparent from a detailed description of embodiments of the invention which follows.

DESCRIPTION OF THE PREFERRED EMBODIMENT

Figure 1:
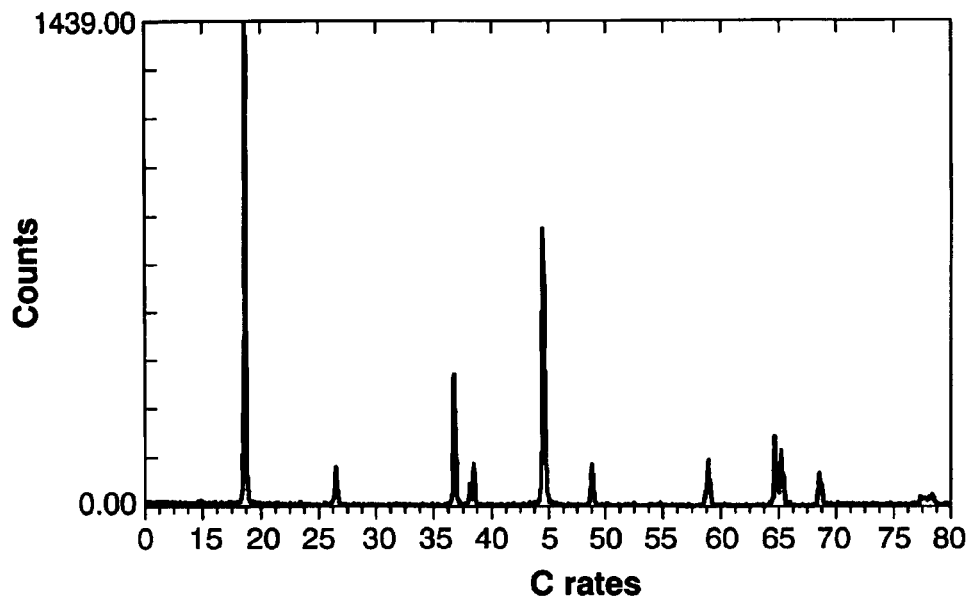
FIG. 1 is an X-ray diffraction pattern (Cu Kα radiation) of $Li_{1.0}Ni_{0.70}Co_{0.10}Mg_{0.075}Ti_{0.075}Al_{0.05}O_2$ (SLN4) cathode material for a lithium battery.

Examples of the method of this invention for synthesizing lithium cathode material are provided below. The molar ratios of the constituent atoms are based on lithium as being 1.0 and are reflected in one of the following formulas:

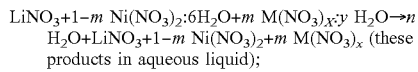 (SLN4),
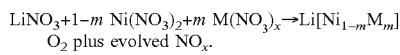 (SLN9), and
$Li_{1.0}Ni_{0.7}Co_{0.2}Mg_{0.05}Al_{0.05}$ (SLN8 and SLN13).

EXAMPLE 1

Solution (SLN) 4

Synthesis

The following amounts of the identified materials were weighed into a reaction vessel without mixing: 17.24 g of $LiNO_3$, 50.89 g of $Ni(NO_3)_2{\cdot}6H_2O$, 7.28 g of $Co(NO_3)_2{\cdot}6H_2O$, 4.81 g of $Mg(NO_3)_2{\cdot}6H_2O$, 4.69 g of $Al(NO_3)_3{\cdot}9H_2O$, 1.50 g of $TiO_2$ powder, and 75.0 g of $H_2O$. In this example, 75 ml of water was used in addition to the water inherently contained in the nitrate salts. However, this water was added as a precaution to obtaining a solution of all the ingredients, except the titanium dioxide powder. Usually it is not necessary to add water apart from the water contained in the crystal structure of the hydrated nitrate salts and, preferably, such additional water is not used in the synthesis of the cathode materials because time and thermal energy is expended in its removal.

The materials in the reactor were heated in a microwave oven until a solution was formed. The microwave oven had a single power setting of 1050 watts and operated at a frequency of 2450 MHz. The liquidation and dissolution of the initially solid hydrated nitrates in this example was completed in about two minutes. At that time the solution temperature was 100–120° C. The solution and small amount of dispersed $TiO_2$ powder were transferred to a vacuum oven.

The pressure in the oven was slowly reduced from atmospheric pressure to between 20–25 inches of Hg at ambient temperature. The reduced pressure on the solution produced a "boiling" action, which thoroughly mixed the constituents. Once the "boiling" had subsided, or very nearly so, the temperature was raised to 120° C. and the same procedure was followed. This step was also repeated at 180° C. By the time the temperature in the vacuum oven reached 180° C., most of the mixture had become solidified. At that point, the temperature was elevated to between 220° and 240° C. and the mixed nitrate salts and titanium dioxide were left to complete drying for 8–24 hours under constant vacuum of approximately 30 inches of Hg.

After the vacuum desiccation procedure was complete, the heat was turned off, but the vacuum was left on until the mixture had reached ambient temperature. Then the anhydrous nitrate salt mixture was removed and placed in a tightly closed dry container to await final heat treatment for the purpose of converting the nitrate salts to a crystalline oxide material.

This final heat treatment consisted of taking the vacuum desiccated material, placing it in a combustion boat, heating it gradually to 300–325° C. and holding it at that temperature for 1–3 hours in air. Then, the sample was heated further for 2–24 hours at a temperature between 700–750° C. in air. When cooled, the sample was placed in another tightly closed, dry atmosphere container to await further analysis and evaluation. The analysis consisted of obtaining an X-ray diffraction pattern (XRD), a quantitative chemical analysis to determine the molar ratio of the metallic elements, electrochemical measurements to determine reversibility of lithium extraction (charge)—lithium insertion (discharge) processes from and into the crystalline oxide material, and BET surface area measurement of the oxide material.

Although the $TiO_2$ did not dissolve with the other constituents in these mixtures, enough mixing took place during the vacuum desiccation procedure to ensure a reasonably uniform product; i.e. there were no noticeable white lumps or distinct particles of $TiO_2$ while the sample was being ground and then transferred to its container.

Chemical analysis of the powder confirmed the elemental proportions of an $Li_{1.0}[Ni_{0.7}Co_{0.1}Ti_{0.075}Mg_{0.075}Al_{0.05}]O_2$ composition. An x-ray diffraction pattern was obtained using a copper K α target. The x-ray diffraction pattern (peak intensities vs. 2 θ diffraction angle) of the sample after heat treatment is shown in FIG. 1. This x-ray diffraction analysis is consistent with the intent that the sample has a layered crystalline structure with a R3m Space Group similar to that of the pure $LiNiO_2$. Thus, this synthetic cathode material consists of slab-like layers of doped $NiO_2$ moieties within the crystal lattice with lithium ions residing between these slabs. The pronounced (003) diffraction peak close to 20° (2 θ) and reduced intensity in the (104) diffraction line close to 45° (2 θ) and the splitting of (006)/(012) lines and (018)/(110) lines around 38° and 65° (2 θ) are clear indication of good crystallinity of the sample within the R3m space group. The narrow (003) diffraction line also indicates an organized stacking of the $NiO_2$ slabs in the c-direction in a hexagonal crystal structure.

Evaluation of the SLN4 Cathode Material in a Cell with a Lithium Anode

An electrode was fabricated from the cathode powder material according to the following procedure. The final composite cathode had the following composition: Example 1 active cathode material, 83 w %; electrically conductive carbon, 12 w %; and; EPDM (a polymer of ethylene-propylene-diene monomer) binder, 5 w %.

About 1 gram of the $Li_{1.0}[Ni_{0.7}Co_{0.1}Ti_{0.075}Mg_{0.075}Al_{0.05}]O_2$ active cathode material was mixed with conductive carbon and binder according to the above formulation. The binder was obtained as a 3 w % solution of EPDM polymer in xylene. Excess xylene (5 ml) was added to the above materials for fluidity and the mixture of cathode oxides, carbon and binder was ground to form an ink-type slurry.

The slurry was coated on one side of the surface of an aluminum foil (13 micron thick), using a doctor blade for more uniform coating thickness. The solvent was evaporated at 100° C. for 2 hours under the vacuum of a rotary pump. A five-inch diameter disc was cut from the coated foil and used as an electrode in an assembly with a lithium disc with similar diameter to form a lithium cell. The electrolyte between the lithium anode and the $Li_{1.0}[Ni_{0.7}Co_{0.1}Ti_{0.075}Mg_{0.075}Al_{0.05}]O_2$ cathode was a porous polyethylene membrane soaked in ethylene carbonate-dimethyl carbonate (EC-DMC 1:1) containing 1M $LiPF_6$ salt. The assembled cell was charged (lithium extraction from the cathode) and discharged (lithium insertion in the cathode), and the capacity of the electrode (mAh/g) was measured.

Figure 2:
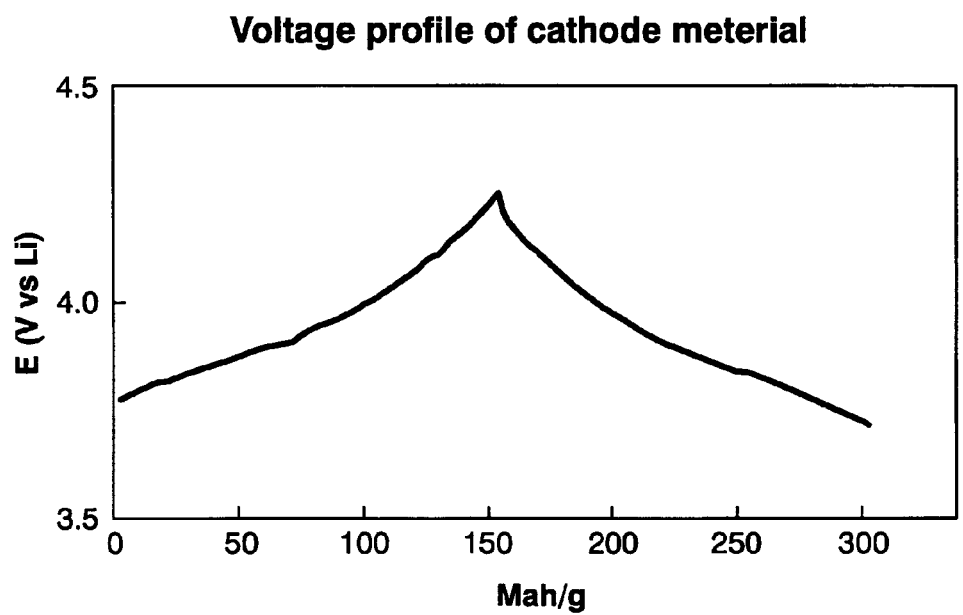
FIG. 2 is a graph of voltage vs. energy density in milli-ampere hours per gram of $Li_{1.0}Ni_{0.70}Co_{0.10}Mg_{0.075}Ti_{0.075}Al_{0.05}O_2$ (SLN4) cathode material during discharge and charge in a cell with a lithium anode.

FIG. 2 shows the voltage profile of the cathode during charge and discharge. The smooth voltage rise during charge and voltage decay during discharge without a clear voltage plateau indicates that the there is no significant phase changes during lithium extraction and insertion processes.

EXAMPLE 2

SLN9

The following amounts of the identified materials were weighed into a reaction vessel without mixing: 68.96 g of $LiNO_3$, 203.56 g of $Ni(NO_3)_2.6H_2O$, 43.65 g of $Co(NO_3)_2.6H_2O$, 12.82 g of $Mg(NO_3)_2.6H_2O$, 7.99 g of $TiO_2$, and 45.01 g of $H_2O$. These amounts of the respective constituents were specified to yield a final crystalline oxide product of the composition: $Li_{1.0}(Ni_{0.7}Co_{0.15}Ti_{0.1}Mg_{0.05})O_2$.

The synthesis of this Example 2 oxide material was the same as was described with respect to Example 1. As in Example 1 the additional 45 grams of water were used to assure fluidity of the liquid for dispersion of the $TiO_2$, but the additional water was not necessary in view of the ample amount of water provided from the crystalline water present in the nitrate salts. After the liquefaction, desiccation and calcining of the Example 2 material, a quantitative chemical analysis confirmed the indicated desired molar ratio of the metallic elements. An XRD likewise confirmed the layered crystalline structure of the R3m Space Group.

An electrode was fabricated from the cathode powder material by the method described in Example 1. An operative battery cell for testing of this $Li_{1.0}(Ni_{0.7}Co_{0.15}Ti_{0.1}Mg_{0.05})O_2$ cathode material was prepared as described in Example 1. The assembled cell was charged (lithium extraction from the cathode) and discharged (lithium insertion in the cathode), and the capacity of the electrode (mAh/g) was measured.

Figure 3:
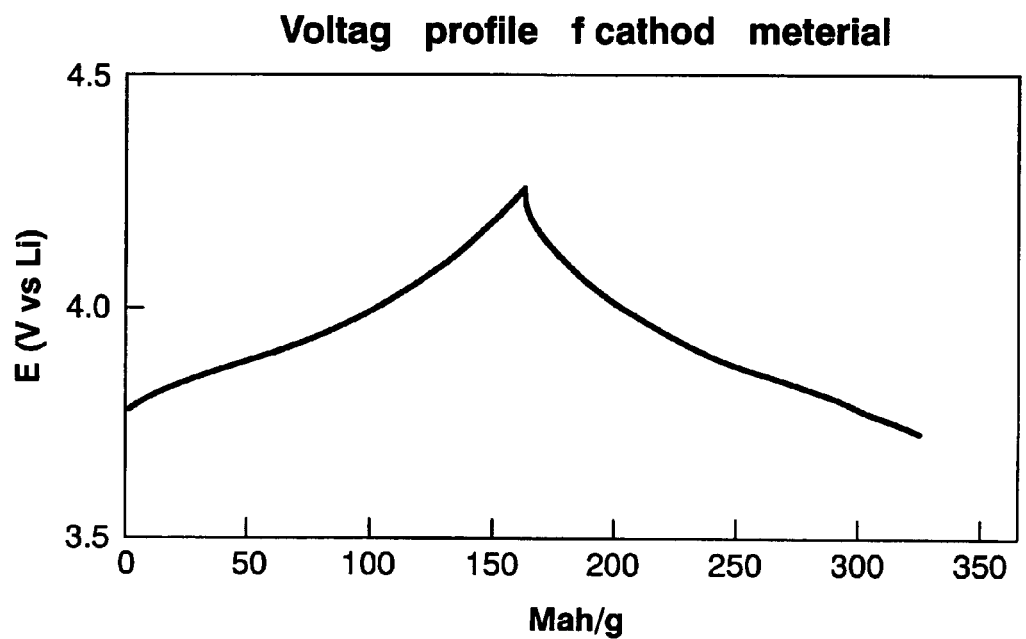
FIG. 3 is a graph of voltage vs. energy capacity of $Li_{1.0}Ni_{0.70}Co_{0.15}Mg_{0.05}Ti_{0.1}O_2$ (SLN9) cathode material during charge and discharge in a cell with a lithium anode.

FIG. 3 shows the voltage profile of the cathode during charge and discharge. The smooth voltage rise during charge and voltage decay during discharge without a clear voltage plateau indicates that the there is no significant phase changes during lithium extraction and insertion processes.

EXAMPLE 3

SLN8

The following amounts of the identified materials were weighed into a reaction vessel without mixing: 68.96 g of $LiNO_3$, 203.56 g of $Ni(NO_3)_2 \cdot 6H_2O$, 43.65 g of $Co(NO_3)_2 \cdot 6H_2O$, 12.82 g of $Mg(NO_3)_2 \cdot 6H_2O$, 18.76 g of $Al(NO_3)_3 \cdot 9H_2O$, and 38.64 g of $H_2O$. These amounts of the respective constituents were specified to yield a final crystalline oxide product of the composition: $Li_{1.0}(Ni_{0.7}Co_{0.2}Mg_{0.05}Al_{0.05})O_2$.

The synthesis of this Example 3 oxide material was the same as described with respect to Example 1. As in Example 1 the additional water were used to assure fluidity of the liquid but the additional water was not necessary in view of the ample amount of water provided from the crystalline water present in the nitrate salts. After the liquefaction, desiccation and calcining of the Example 3 material, a quantitative chemical analysis confirmed the indicated desired molar ratio of the metallic elements. An XRD likewise confirmed the layered crystalline structure of the R3m Space Group.

An electrode was fabricated from the cathode powder material by the method described in Example 1. An operative battery cell for testing of this $Li_{1.0}(Ni_{0.7}Co_{0.2}Mg_{0.05}Al_{0.05})O_2$ cathode material was prepared as described in Example 1. The assembled cell was charged (lithium extraction from the cathode) and discharged (lithium insertion in the cathode), and the capacity of the electrode (mAh/g) was measured.

Figure 4:
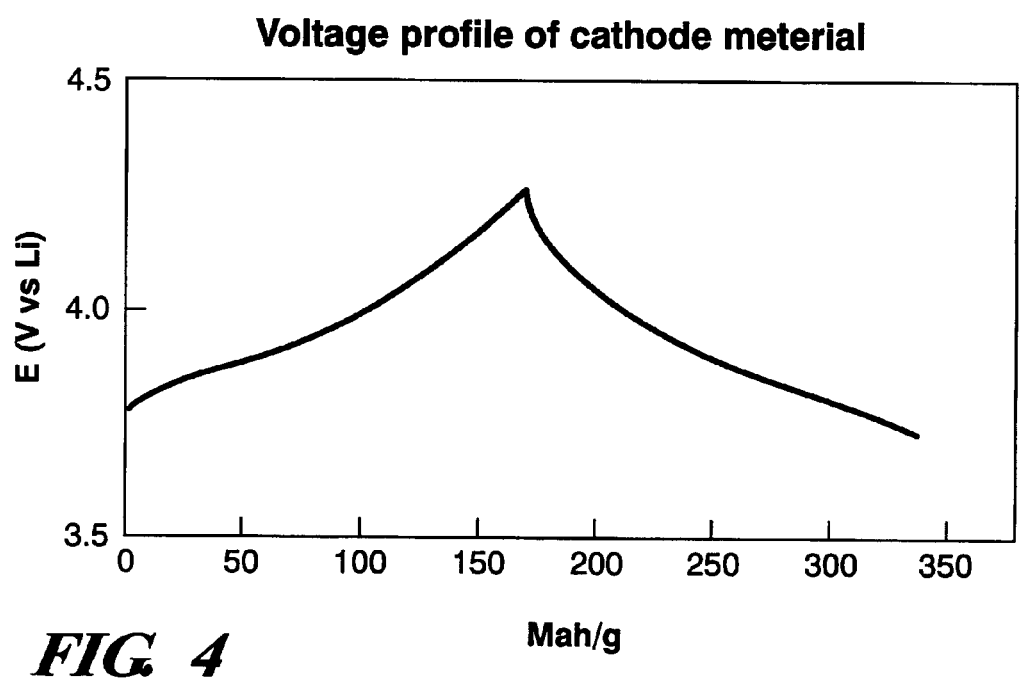
FIG. 4 is a graph of voltage vs. energy capacity of $Li_{1.0}Ni_{0.70}Co_{0.20}Mg_{0.05}Al_{0.05}O_2$ (SLN8) during discharge and charge in a cell with a lithium anode.

FIG. 4 shows the voltage profile of the cathode during charge and discharge. The smooth voltage rise during charge and voltage decay during discharge without a clear voltage plateau indicates that the there is no significant phase changes during lithium extraction and insertion processes.

EXAMPLE 4

SLN13 (This is a Preferred Procedure for Preparation of Lithium Cathode Materials.)

The following amounts of the identified materials were weighed into a reaction vessel without mixing: 68.96 g of $LiNO_3$, 203.56 g of $Ni(NO_3)_2 \cdot 6H_2O$, 58.20 g of $Co(NO_3)_2 \cdot 6H_2O$, 12.82 g of $Mg(NO_3)_2 \cdot 6H_2O$, 18.76 g of $Al(NO_3)_3 \cdot 9H_2O$. These amounts of the respective constituents were specified to yield a final crystalline oxide product of the composition: $Li_{1.0}(Ni_{0.7}Co_{0.2}Mg_{0.05}Al_{0.05})O_2$.

The synthesis of this Example 4 oxide material was substantially the same as described with respect to Example 1. However, in this example no additional water beyond the crystalline water contained in the nitrate salts was used. In general, it is preferred to use only the crystalline water content of the precursor metal acid salts for liquefaction and homogenization of the metals.

After the liquefaction, desiccation and calcining of the Example 4 material, a quantitative chemical analysis confirmed the indicated desired molar ratio of the metallic elements. An XRD likewise confirmed the layered crystalline structure of the R3m Space Group.

An electrode was fabricated from the cathode powder material by the method described in Example 1. An operative battery cell for testing of this $Li_{1.0}(Ni_{0.7}Co_{0.2}Mg_{0.05}Al_{0.05})O_2$ cathode material was prepared as described in Example 1. The assembled cell was charged (lithium extraction from the cathode) and discharged (lithium insertion in the cathode), and the capacity of the electrode (mAh/g) was measured.

Figure 5:
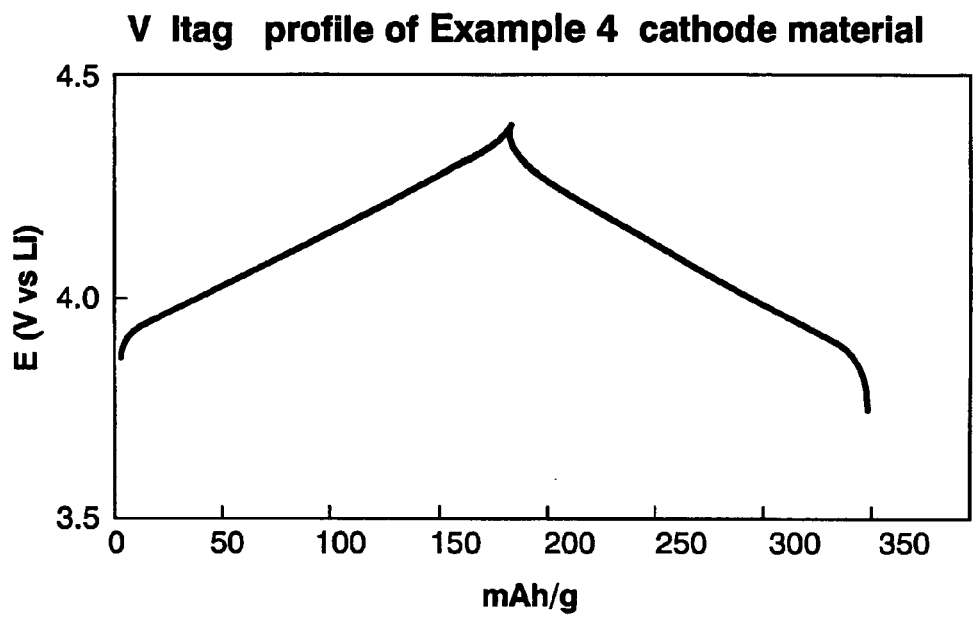
FIG. 5 is a graph of voltage profile vs. energy capacity of $Li_{1.0}Ni_{0.70}Co_{0.20}Mg_{0.05}Al_{0.05}O_2$ (SLN13) during discharge and charge in a cell with a lithium anode.

FIG. 5 shows the voltage profile of the cathode during charge and discharge. The smooth voltage rise during charge and voltage decay during discharge without a clear voltage plateau indicates that the there is no significant phase changes during lithium extraction and insertion processes.

Figure 6:
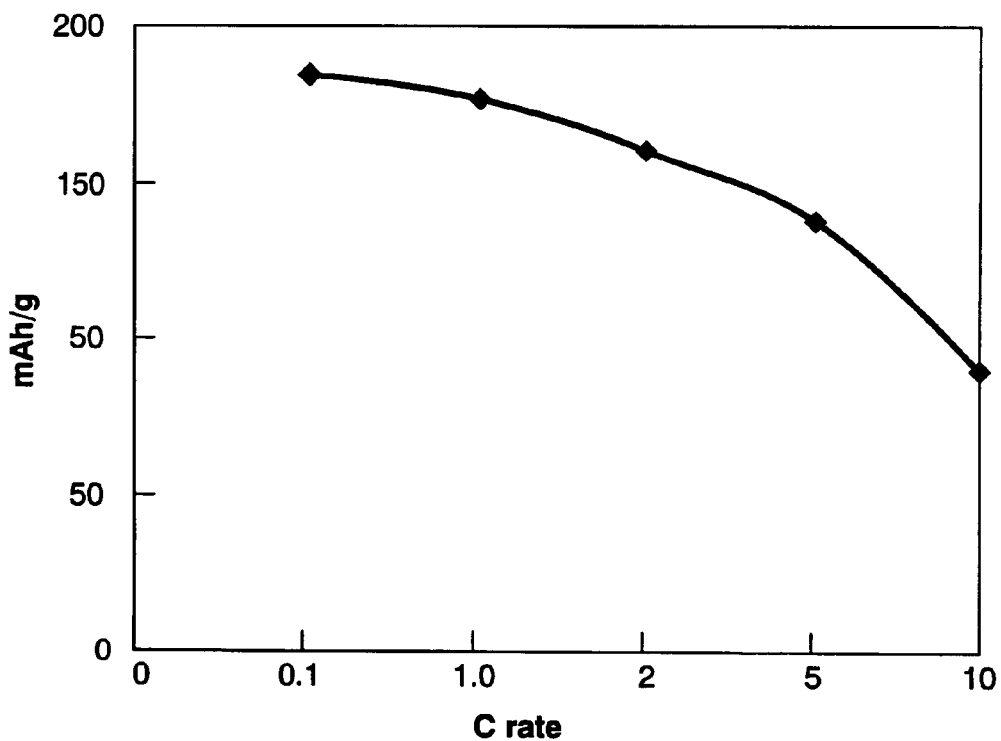
FIG. 6 is a graph of energy capacity (in milli-ampere hours per gram) of $Li_{1.0}Ni_{0.70}Co_{0.20}Mg_{0.05}Al_{0.05}O_2$ (SLN13) at various discharge rates (C), from C/10 to 10C rates, in a cell with a lithium anode.

FIG. 6 shows the capacity of the battery cell in milliampere hours per gram of the Example 4 cathode material as a function of discharge rates, i.e., C rates. (by definition, 1C rate is the rate in which the cell can be discharged in one hour. For example; 0.1C rate is discharge rate for 10 hours, and the 10C rate is equivalent of discharge rate in 1/10 hour). As is typical with secondary batteries, the capacity deceases as the discharge rate is increased. The data in FIG. 6 is typical of useful cathode materials prepared by this invention.

Figure 7:
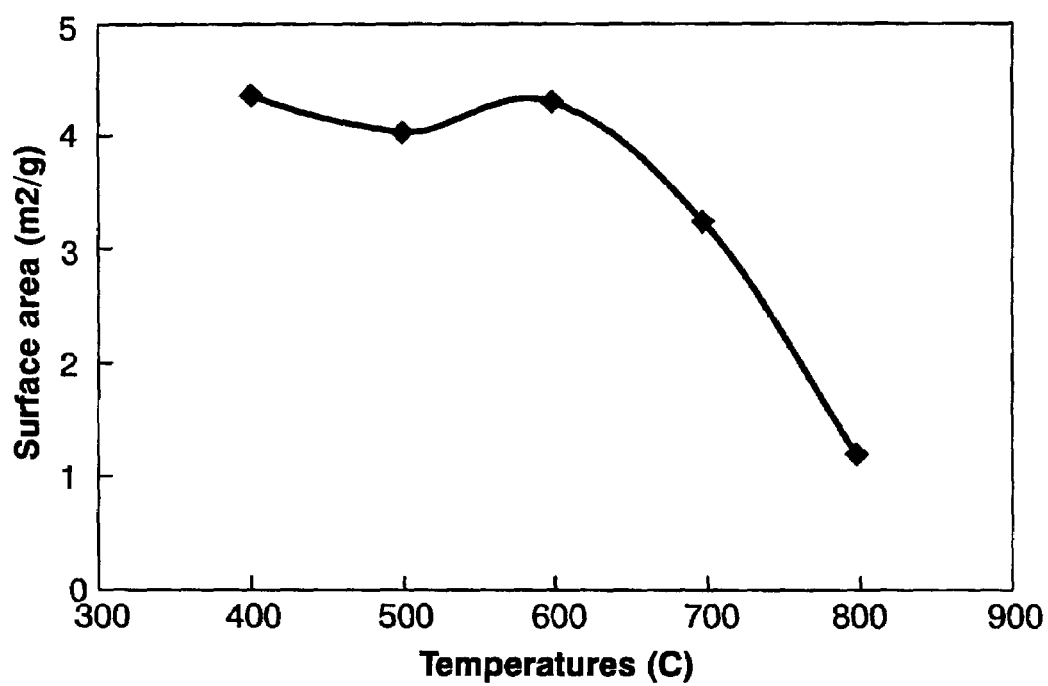
FIG. 7 is a graph of average surface areas ($m^2/g$) of cathode materials prepared by the method of this invention versus heat treatment temperatures, in ° C.

The surface area of Examples 1–4 samples was measured by liquid nitrogen BET method, and the average results are shown in FIG. 7. The surface area reduces during the heat treatment and approached 1.3 $m^2/g$ at 800° C. In general, higher surface area values are preferred and, therefore, lower calcining temperatures for the material of interest are used.

The practice of this invention has been illustrated with examples for selected lithium battery cathode materials. However, it will readily be recognized by one skilled in the art and as has been disclosed herein that many mixed metals containing oxide crystalline structures can be prepared by this invention.

What is claimed is:

1. A method of making a crystalline metal oxide powder material comprising two or more metal elements combined in uniform proportions with oxygen in the crystal structure, said method comprising:

combining water soluble, crystalline, water containing, oxygen containing inorganic acid salt compounds of at least two of said metals into a body of crystals that contains said two metals in separate compounds;

heating the body of crystals with microwave radiation to remove the water from the crystals and form a liquid mixture containing said water and a uniform distribution of said metal elements;

removing the water under reduced atmospheric pressure to form a dry mixture of metal acid salt compounds; and heating the dry mixture to decompose said acid to leave a powder residue of said metal oxide powder material.

2. The method as recited in claim 1 in which at least two of said metals are initially contained in hydrated nitrate or hydrated nitrite compounds.

3. The method as recited in claim 2 in which said metal oxide powder comprises two or more metals selected from the group consisting of aluminum, cobalt, lithium, nickel, magnesium and manganese.

4. The method as recited in claim 3 in which said water containing, crystalline, oxygen containing inorganic acid salt compounds are selected from the group consisting of $LiNO_3 \cdot H_2O$, $Ni(NO_3)_2 \cdot 6H_2O$, $Co(NO_3)_2 \cdot 6H_2O$, $Al(NO_3)_3 \cdot 9H_2O$, and $Mg(NO_3)_2 \cdot 6H_2O$.

5. A method of synthesizing a crystalline material of $Li(Ni_xM_{1-x})O_2$, where M is one or more dopant metals for said crystalline material and $0.5 \leq x \leq 0.7$, said method comprising:

combining water soluble, crystalline, oxygen containing inorganic acid salt compounds of each of lithium, nickel and at least one of said dopant metals into a body of crystals where at least two of said salt compounds contain water;

heating the body of crystals to with microwave radiation remove the water from the crystals and form a liquid mixture containing said water and a uniform distribution of Li, Ni and said dopant metals;

removing the water under reduced atmospheric pressure to form a dry mixture of metal salt compounds; and heating the dry mixture to decompose said acid to leave a powder residue of said $Li(Ni_xM_{1-x})O_2$ material.

6. The method as recited in claim 5 in which dopant metals are selected from the group consisting of aluminum, cobalt, magnesium and titanium, said titanium being used as titanium dioxide.

7. The method as recited in claim 5 in which each of said inorganic acid compounds is a nitrate or nitrite compound.

8. The method as recited in claim 6 in which each of said inorganic acid compounds is a nitrate or nitrite compound.

9. The method as recited in claim 7 in which said nitrate compounds are selected from the group consisting of $LiNO_3 \cdot H_2O$, $Ni(NO_3)_2 \cdot 6H_2O$, $Co(NO_3)_2 \cdot 6H_2O$, $Al(NO_3)_3 \cdot 9H_2O$, and $Mg(NO_3)_2 \cdot 6H_2O$.

10. A method of synthesizing a crystalline material of $Li(Ni_xM_{1-x})O_2$, where M is one or more dopant metals for said crystalline material and $0.5 \leq x \leq 0.7$, said method comprising:

combining water soluble, crystalline, nitrate or nitrite compounds of each of lithium, nickel and at least one of said dopant metals into a body of crystals where at least two of said nitrate or nitrite compounds contain water;

heating the body of crystals with microwave radiation to remove the water from the crystals and form a liquid mixture comprising a solution containing said water and a uniform distribution of Li, Ni and said dopant metals;

removing the water under reduced atmospheric pressure to form a dry mixture of metal salt compounds; and heating the dry mixture to decompose said acid to leave a powder residue of said $Li(Ni_xM_{1-x})O_2$ material.

11. The method as recited in claim 10 in which said nitrate compounds are selected from the group consisting of $LiNO_3 \cdot H_2O$, $Ni(NO_3)_2 \cdot 6H_2O$, $Co(NO_3)_2 \cdot 6H_2O$, $Al(NO_3)_3 \cdot 9H_2O$, and $Mg(NO_3)_2 \cdot 6H_2O$.

* * * * *